United States Patent
Martel

(10) Patent No.: US 12,174,586 B2
(45) Date of Patent: Dec. 24, 2024

(54) TIMEPIECE COMPRISING A DISPLAY WITH A MOIRÉ EFFECT

(71) Applicant: Manufacture d'Horlogerie Audemars Piguet SA, Le Brassus (CH)

(72) Inventor: Julien Martel, La Chaux-de-Fonds (CH)

(73) Assignee: MANUFACTURE D'HORLOGERIE AUDEMARS PIGUET SA, Le Brassus (CH)

( * ) Notice: Subject to any disclaimer, the term of this patent is extended or adjusted under 35 U.S.C. 154(b) by 343 days.

(21) Appl. No.: 17/687,719

(22) Filed: Mar. 7, 2022

(65) Prior Publication Data

US 2022/0291632 A1    Sep. 15, 2022

(30) Foreign Application Priority Data

Mar. 9, 2021   (CH) ........................................ 253/21

(51) Int. Cl.
  *G04B 19/04*   (2006.01)
  *G02B 27/60*   (2006.01)
  (Continued)

(52) U.S. Cl.
  CPC ........... *G04B 19/046* (2013.01); *G02B 27/60* (2013.01); *G04B 45/0007* (2013.01); *G04F 3/022* (2013.01); *G04F 7/00* (2013.01)

(58) Field of Classification Search
  CPC ... G04B 19/046; G04B 45/0007; G02B 27/60
  See application file for complete search history.

(56) References Cited

U.S. PATENT DOCUMENTS 4,006,588 A * 2/1977 McMahon ........... G04B 19/046
                                                      968/145
5,586,089 A   12/1996 MacGarvey
(Continued)

FOREIGN PATENT DOCUMENTS

CH    316845 A     12/1956
CH    709374 A1    8/2015
(Continued)

OTHER PUBLICATIONS

Machine translation of Witt (CH 709374 A1), original provided by the Applicant (Year: 2024).*
Machine translation for WO 9100554 (Year: 2024).*

*Primary Examiner* — Edwin A. Leon
*Assistant Examiner* — Sean R Brannon
(74) *Attorney, Agent, or Firm* — BLANK ROME LLP

(57) ABSTRACT

A timepiece has a watch movement including a complication of the chronograph or countdown type, a fixed body (10) and a display (20) with moiré effect for displaying a time information associated with the chronograph or the countdown. The display has a mobile disc (22) with an indicator (24) of the time information. The mobile disc (22) is connected to an axis (23) in engagement with the watch movement and arranged to rotate above or below the fixed body (10). One of the mobile disc (22) and the fixed body (10) has a plurality of apertures (26) arranged over 360°. The other of the mobile disc (22) and the fixed body (10) includes a marking with a repetition of patterns including a first set of patterns having a first visual appearance (27) and a second set of patterns having a second visual appearance (28).

17 Claims, 3 Drawing Sheets

(51) Int. Cl.
　　　*G04B 45/00*　　　(2006.01)
　　　*G04F 3/02*　　　(2006.01)
　　　*G04F 7/00*　　　(2006.01)

(56) References Cited

U.S. PATENT DOCUMENTS

| | | | | |
|---|---|---|---|---|
| 6,754,139 B2* | 6/2004 | Herbstman | .......... | G04B 19/202 |
| | | | | 368/79 |
| 7,450,475 B2* | 11/2008 | Seyr | ............. | G04B 19/202 |
| | | | | 368/107 |
| 7,502,280 B2 | 3/2009 | Mueller | | |
| 9,458,064 B2* | 10/2016 | Huguet | ............. | C04B 35/48 |
| 2021/0191324 A1* | 6/2021 | Oberson | ............ | G04B 45/0015 |

FOREIGN PATENT DOCUMENTS

| | | | | |
|---|---|---|---|---|
| GB | 2206712 A | | 1/1989 | |
| WO | WO9100554 A1 * | | 1/1991 | ............. G04B 45/00 |

\* cited by examiner

TIMEPIECE COMPRISING A DISPLAY WITH A MOIRÉ EFFECT

RELATED APPLICATION

The present application claims priority to Swiss Patent Application No. 00253/21, filed Mar. 9, 2021. The contents of this application is incorporated hereby in its entirety.

FIELD OF THE INVENTION

The present invention relates to a timepiece comprising a display with a moiré effect for quickly indicating whether a complication of the timepiece is running or stopped.

STATE OF THE ART

Timepieces comprising a display with a moiré effect are already known.

As an example, U.S. Pat. No. 5,586,089 discloses a timepiece having a plurality of discs instead of the standard hour, minute and second hands, printed with patterns of transparent or opaque areas. As these plates rotate, new and stimulating visual effects are produced by the superimposition of the plates in the form of multiple moiré images. The display of hours, minutes and seconds is achieved by indicators at the periphery of the discs and pointing to an annular scale from 1 to 12 arranged on an annular dial. This solution requires delicate transparent plates.

CH709374A1 describes a timepiece with two superimposed bodies that also uses the moiré effect to give the effect of an indication rotating faster than the relative rotation speed of the two bodies.

The moiré effect used in the timepieces of the prior art is only intended to produce an interesting visual effect.

BRIEF SUMMARY OF THE INVENTION

An aim of the present invention is therefore to propose a timepiece comprising a display with a moiré effect to determine at a glance whether a complication of the chronograph or countdown type is running or stopped (on or off), while allowing the reading of time information.

According to the invention, this aim is achieved notably by means of a timepiece comprising a watch movement including a complication of the chronograph or countdown type, a fixed body and a display with a moiré effect for displaying time information associated with the chronograph or the countdown. The display comprises a mobile disc connected to an indicator of the time information. The mobile disc is, on the one hand, connected to an axis in engagement with the watch movement and, on the other hand, arranged to rotate above or below the fixed body. One of the mobile disc and the fixed body has a plurality N of apertures arranged over 360°. The other of the mobile disc and the fixed body includes a marking having a pattern repetition comprising a first set of patterns having a first visual appearance and a second set of patterns having a second visual appearance. The patterns having the first visual appearance are arranged alternately with the patterns having the second visual appearance over 360°. The plurality of apertures are separated from each other by a plurality of portions for progressively masking the patterns of the marking to produce the moiré effect as the moving disc rotates.

The fixed body may be connected to the dial. The fixed body may be constituted by a portion of the dial.

The disc may be a disc that is solid. Alternatively, the disc may be formed by a ring.

The very rapid displacement of the patterns relative to the apertures makes it possible to detect at a glance that the complication displayed by a chronograph or countdown counter is running. The displacement of the time information indicator makes it easy to read this time indication.

The time information indicator may be displayed on the mobile disc below the fixed body and be visible through one of the apertures. In this first embodiment, the width of the time information indicator is preferably equal to or greater than the pitch of the apertures, such that the time information indicator is always visible through at least one of the apertures. The time information can be read by checking which aperture is superimposed on this indicator.

In a second embodiment, the time information indicator may be displayed on the mobile disc above the fixed body and thus be always visible.

According to an embodiment, the display is a counter comprising the mobile disc with its rotation axis coaxial with the central axis of the counter.

The time information indicator may be in the form of a segment disposed on the mobile disc or in the form of a hand mounted on the axis of the mobile disc so that the counter can indicate a time information.

The patterns may be formed by radial segments. The apertures may be formed by radial apertures.

In an embodiment, the counter is a counter for seconds. The mobile disc is in engagement with the watch movement to be driven at a rate of one revolution per minute so that the indicator indicates the seconds.

In the second embodiment with a mobile disc above the fixed body, the counter comprises a first annular zone comprising the marking. The first annular area is an integral part of the fixed body. The fixed body is part of the dial or is added onto the dial. The mobile disc comprises a second annular zone comprising the plurality of apertures arranged over 360°.

The number of apertures is equal to N.

In an alternative embodiment of the second embodiment, the number of apertures N is greater than the number of patterns having a first visual appearance, and also greater than the number of patterns having a second visual appearance. The angular spacing between the centrelines of two adjacent patterns of the same visual aspect is then greater than the spacing between the centrelines of two adjacent apertures. For example, the number of apertures can be equal to N and the number of patterns of each visual aspect can be equal to N−1. The moiré effect then generates a displacement of patterns behind the apertures in the direction of rotation of the mobile disc.

In another alternative of the second embodiment, again with a mobile disc above the fixed body, the number of apertures N is smaller than the number of patterns (e.g., N+1) having a first visual aspect, and also smaller than the number of patterns having a second visual aspect. Thus, the angular spacing between the centrelines of two adjacent patterns of the same visual aspect is smaller than the spacing between the centrelines of two adjacent apertures. For example, the number of apertures can be equal to N and the number of patterns of each visual aspect can be equal to N+1. The moiré effect then generates a displacement of patterns behind the apertures in the reverse direction of rotation of the mobile disc.

In accordance with the first embodiment mentioned above, it is also possible to place the mobile disc provided with patterns below the fixed body provided with apertures;

this inversion also causes a reversal of the direction of displacement of patterns. In an alternative to this embodiment, the number of apertures N is larger than the number of patterns (e.g. N−1) having a first visual appearance, and also larger than the number of patterns having a second visual appearance. The moiré effect then generates a displacement of patterns behind the apertures in the reverse direction of rotation of the mobile disc.

In another alternative to this first embodiment, again with a mobile disc below the fixed body, the number of apertures N is smaller than the number of patterns (e.g. N+1) having a first visual aspect, and also smaller than the number of patterns having a second visual aspect. The moiré effect then generates a displacement of patterns behind the apertures in the direction of rotation of the mobile disc.

In an embodiment, the number of apertures N or the number of patterns is equal to 30 to obtain a moiré effect of two seconds when the complication is in operation, whereas in reality the mobile disc performs one rotation in 60 seconds.

An embodiment with 30 patterns of each type and 29 or 31 apertures on a mobile disc above the fixed body is advantageous, as it allows the time information indicator to be displayed at all times In an embodiment, the counter comprises a first annular area including the marking. The first annular area is part of the mobile disc. The mobile disc is arranged under the fixed body, for example under the dial. The fixed body comprises a second annular zone superimposed on the first annular zone. The second annular area comprises the plurality of apertures arranged over 360°.

In an embodiment, the second annular zone comprises N apertures. The marking for its part comprises N+2 or N−2 patterns. This type of realization makes it possible to obtain a symmetrical moiré effect, that is to say that on one axis two apertures will appear black at the same time and on a perpendicular axis two apertures will appear white.

In an embodiment, the time information indicator has a different visual appearance than the first and second visual appearance of the patterns of the marking.

The time information indicator may be sized so that a portion of the indicator is visible through an aperture to indicate the time information while the other portion of the indicator is hidden by a portion of the fixed body between two apertures, so that the indicator is still partially visible upon rotation of the mobile disc.

In an embodiment, the patterns of the first and second sets forming the marking are each in the form of a truncated angular segment. The angle between the centrelines of two successive identical patterns, for example the angle between the centrelines of two black patterns, is equal to 360/(N−1)/2 degrees or 360/(N+1)/2 degrees, where N is the number of apertures. In an embodiment with N=30 apertures, this angle may be, for example, 360/29/2 degrees or 360/31/2 degrees.

The patterns in a first set cover, for example, an angular segment of 360/(N−1)/2 degrees or 360/(N+1)/2 degrees, for example, a segment of about 6° in the case where the number of apertures N=30.

In an embodiment, one of the first and second visual appearance of the patterns of the marking is identical to the visual appearance of the mobile provided with the apertures, respectively identical to the visual appearance of the fixed body provided with the apertures. This maximizes the moiré effect. For example, if the marking comprises alternately black and white patterns, the mobile or the disc provided with apertures is advantageously either black or white.

In an embodiment, there is a high contrast between the first visual aspect and the second visual aspect. One of the first and second visual aspects is, for example, a uniform black colour, the other of the first and second visual aspects being, for example, a uniform white colour.

BRIEF SUMMARY OF THE FIGURES

Examples of embodiments of the invention are shown in the description illustrated by the appended figures in which.

EXAMPLE(S) OF EMBODIMENTS OF THE INVENTION

Figure 1:
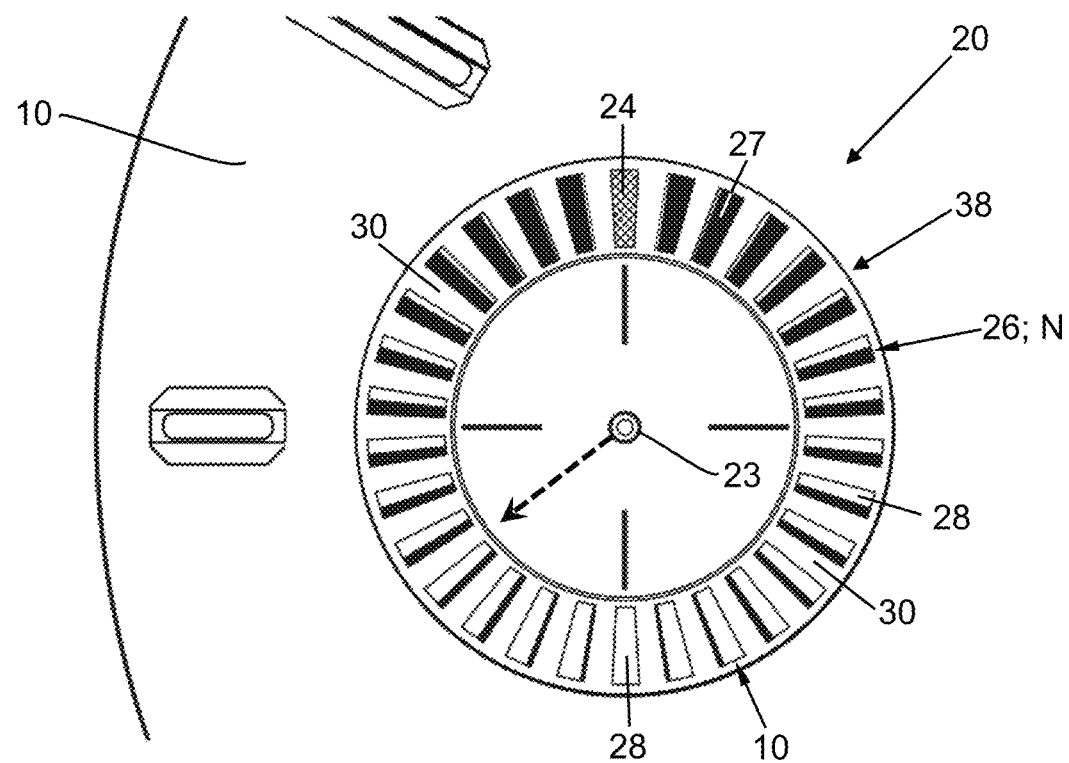
FIG. 1 illustrates a partial view of a dial of a timepiece comprising a counter combining the indication of a temporal information and an animation with moiré effect according to a first embodiment.
Figure 2:
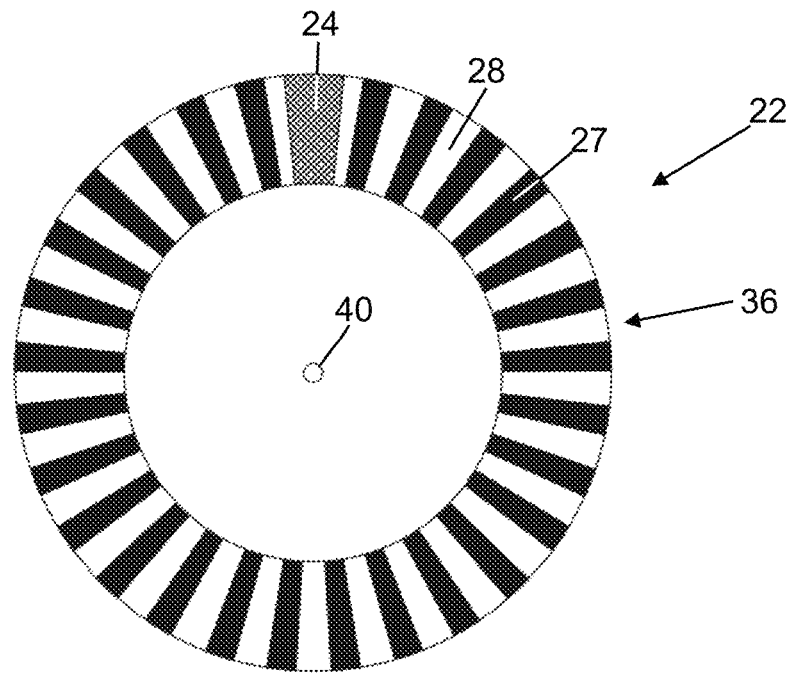
FIG. 2 illustrates a top view of the mobile disc arranged under the dial of FIG. 1 in correspondence with the counter.

In a first embodiment of the invention illustrated by FIGS. 1 and 2, a timepiece (not shown) comprises a counter 20 configured, on the one hand, to indicate time information and, on the other hand, to produce an animation with moiré effect.

The counter 20 comprises a fixed body 10 and a mobile disc 22 (FIG. 2). In this example embodiment, the fixed body 10 is constituted by a portion of the dial, for example an annular portion of the dial. It is also possible to provide a fixed body in the form of a part attached to the dial, for example a part attached to an annular portion of the dial, or a bridge of the movement for example. The fixed body is thus fixed with respect to the plate of the watch movement.

The counter 20 may for example be a counter of the seconds of a chronograph or the seconds of a countdown timer. The counter 20 comprises a peripheral annular zone 38 having a plurality of apertures 26 arranged over 360°. These apertures 26 are formed in the fixed body 10.

In this first embodiment, the mobile disc 22 of FIG. 2 is arranged under the fixed body 10 according to FIG. 1. The disc 22 has an opening 40 in its centre so that the disc can be securely mounted on an axis 23, for example by driving in. The axis 23 passes through an opening in the centre of the counter 20 and has a pinion (not shown) arranged to engage with the movement of the timepiece so that it can be driven in rotation. A hand can be mounted on the axis 23 above the counter.

The mobile disc 22 comprises a peripheral annular area 36 comprising a marking having a repetition of patterns comprising a first set of patterns having a first visual appearance 27 and a second set of patterns having a second visual appearance 28.

The choice of the visual aspect of the patterns of the first and second sets of the marking is dictated not only by aesthetic considerations but also by technical considerations since there must be a high contrast between the first visual aspect and the second visual aspect so that the moiré effect is optimal allowing to know at a glance if, for example, the chronograph function is running or stopped.

As a non-limiting example, the first visual aspect is a uniform black colour while the second visual aspect is a uniform white colour. It should be noted that the patterns of the marking can have a non-uniform visual appearance as long as a contrast is obtained between the patterns of the first and second set constituting the marking.

According to FIG. 2, the patterns having the first visual appearance are arranged alternately with the patterns having the second visual appearance over 360° in a peripheral annular area 36.

The peripheral annular area 38 of the counter 20 comprises N apertures 26 made in the fixed body 10. The apertures 26 (FIG. 1) are separated from each other by a plurality of portions 30 of the fixed body intended to progressively mask the patterns of the marking of the mobile disc 22 in order to produce the moiré effect when the disc 22 is rotated.

The marking arranged on the peripheral annular area 36 of the mobile disc 22 comprises a different number of patterns from the first set and from the second set. As an example, the marking may include N−1, N+1, N−2 or N+2 patterns of each type.

In the alternative embodiment illustrated in FIGS. 1 and 2, the peripheral annular area 38 of the fixed body 10 of the counter 20 has N=30 apertures 26 while the marking of the mobile disc 22 has a number less than N patterns of a first visual aspect 27, for example black coloured patterns arranged alternately with patterns of a second visual aspect 28, for example white coloured patterns. The indicator 24 is an integral part of the marking.

In this example, the marking of the peripheral annular area 36 of the mobile disc 22 includes:
  28 black colour patterns that are each in the shape of a truncated angular segment, are spaced apart from each other by an angular pitch equal to 360/(N−1)/2 degrees, where N is the number of apertures. Although there are only 28 black patterns visible, the regular spacing between these patterns over 360 degrees corresponds to 29 patterns. The number of apertures 26 in this example being 30 apertures, the angle is therefore 6.2° per truncated sector.
  27 patterns of white colour which have each the shape of a truncated angular segment having an angle of 6.2° arranged in alternation with the patterns of black colour,
  2 patterns of white colour which each have the shape of a truncated angular segment narrower than the other white patterns, for example over an angle of 3.1°,
  and a third pattern 24 having a contrasting visual appearance to the first and second patterns 27, 28.

This third pattern 24 is also in the form of a truncated angular segment, but in this example extends over a wider angle than the black patterns, for example over 12.4°. This third pattern 24 is arranged between the two narrower white angular segments and serves the function of a time information indicator, preferably the seconds. The wider dimensions of this pattern make it an indicator that is always visible through one of the apertures 26 of the fixed body, since the angular width of this indicator corresponds in this example to that of two black segments, one visible in one of the apertures 26 of the fixed body, the other masked by one of the portions 30 of the fixed body located between the apertures.

For example, the pattern 24 may indicate the seconds of a counter of seconds 20 of a chronograph. When the counter 20 is started, the pattern 24 will indicate the current second in increments of two.

When a black angular sector is fully visible through one of the apertures 26, it will take one second to hide under one of the portions 30 of the fixed body 10, and then a second to reappear in the next aperture. A visual effect can thus be observed which gives the impression that the black angular sectors make a turn in two seconds, this impression being named "moiré effect". The moiré effect moves in the reverse direction of the rotation of the mobile disc in this embodiment It is also possible to achieve a moiré effect that moves in the direction of rotation of the mobile disc, by providing a number of patterns of each visual aspect that is greater than the number of apertures N. As an example, the fixed body could have 30 apertures and the movable disc 31 patterns of each colour.

According to another embodiment not shown, the seconds are indicated by means of a seconds hand connected to the axis 23 of the mobile disc 22, for example by driving.

In this case, the marking of the peripheral annular area 36 of the mobile disc 22 may include, for example, 29 patterns of a first visual appearance, for example black, which each have the shape of a truncated angular segment having an angle of 6.2° as well as 29 patterns of a second visual appearance, for example white, which each have the shape of a truncated angular segment having an angle of 6.2°. The white patterns are arranged alternately with the black patterns. This embodiment has the advantage of improving the resolution of the seconds display.

FIGS. 3 to 7 show the elements of the counter without the fixed body of the watch, according to a second embodiment with a mobile disc 22 provided with apertures above a fixed body for example linked to the dial. According to FIG. 3, the mobile disc 22 comprises a peripheral annular zone 34 provided with N apertures 26 regularly spaced from each other over 360°. The annular marking shown in FIG. 5 comprises N−1 patterns of each type. In this example, the mobile disc 22 has N=31 apertures 26 and the annular marking has (N−1)=30 black patterns and (N−1)=30 white patterns.

Each aperture 26 is identical in shape and size. The aperture may be, for example, in the form of a truncated angular sector or circular sector. The peripheral annular area of the mobile disc further includes a time indication 24 for example in the form of a line disposed between two openings, or a hand.

The mobile disc 22 can be, for example, a mobile of the seconds. The mobile of the seconds can be intended to indicate the second of a timepiece integrating a mechanical movement without complication. In an advantageous embodiment, the use of the mobile disc 22 is particularly suitable for a timepiece comprising a mechanical movement with one or more complications of the chronograph or countdown type.

Figure 3:
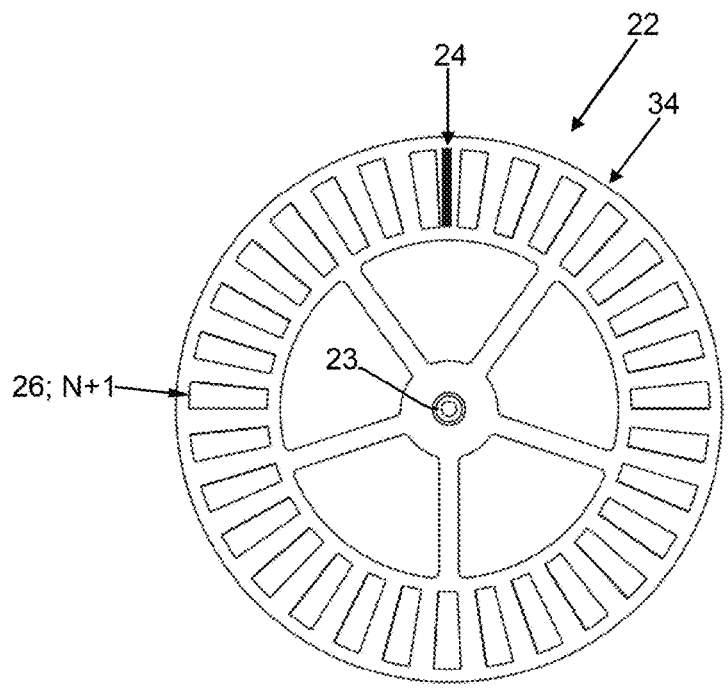
FIG. 3 illustrates a top view of a mobile disc intended to be mounted above the fixed body of a counter according to a second embodiment.
Figure 4:
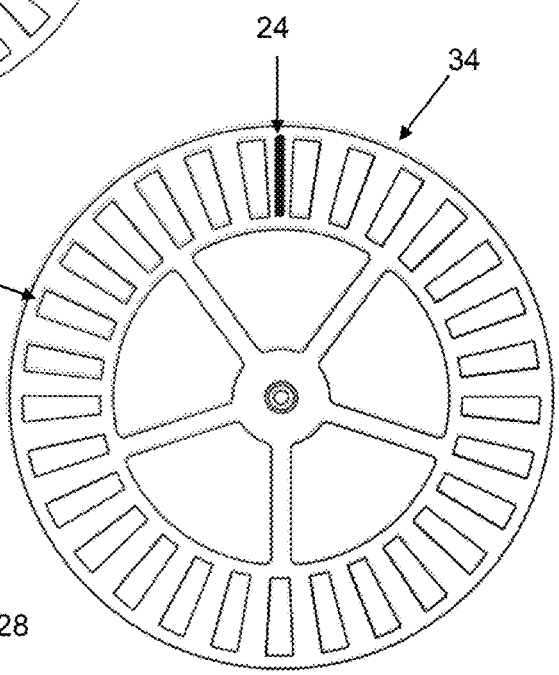
FIG. 4 illustrates a top view of a mobile disc intended to be mounted above the fixed body of a counter according to an alternative of the second embodiment.
Figure 5:
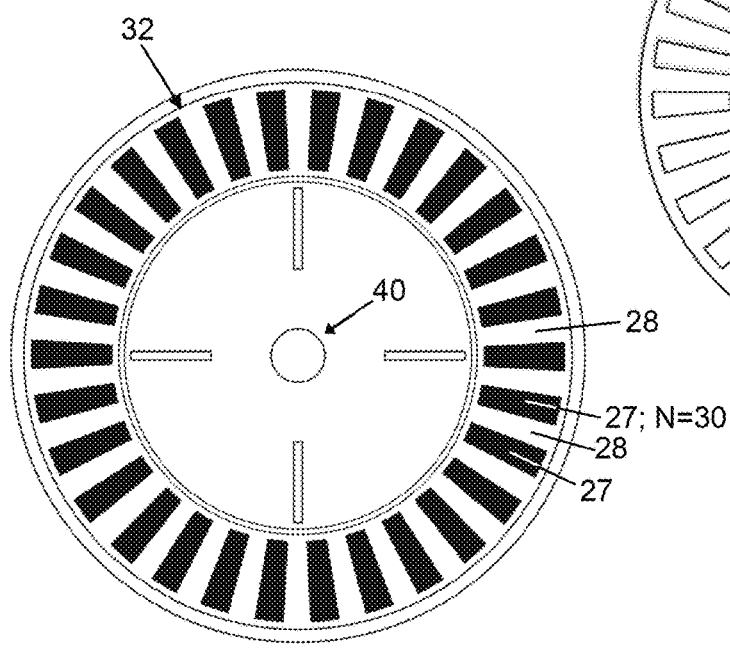
FIG. 5 illustrates a top view of the fixed part of a counter of the timepiece comprising an annular marking according to an alternative of the second embodiment and above which the mobile disc of FIG. 3 or of FIG. 4 is mounted.

According to this embodiment, the mobile disc 22 of FIG. 3 or 4 is driven in an axis of the seconds (not shown) passing through the dial at the level of a central opening 40 in the fixed body of a counter comprising an annular zone 32 concentric with the axis of the seconds (FIG. 5). The annular area 32 includes a marking consisting of a repetition of identically shaped patterns, for example in the form of a truncated angular sector positioned next to each other in the annular area over 360°.

This pattern repetition includes a first set of patterns having a first visual appearance 27, such as black patterns, and a second set of patterns having a second visual appearance 28, such as white patterns. The patterns 27 having the first visual appearance are arranged alternately with the patterns 28 having the second visual appearance over 360°.

Figure 6:
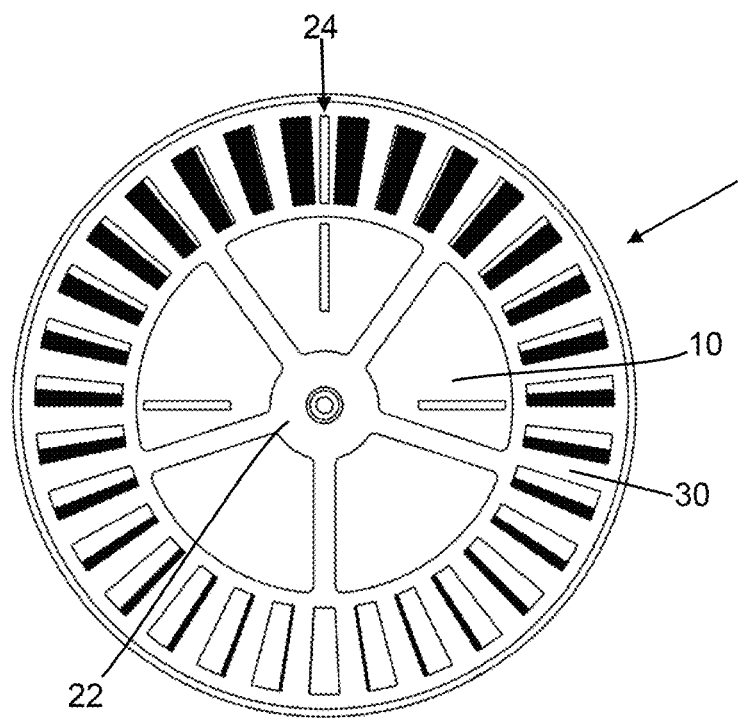
FIG. 6 illustrates the mobile disc of FIG. 3 pivotally mounted on the fixed part of the counter of FIG. 5.

In an embodiment, the mobile disc of FIG. 3 comprises N=31 apertures 26 and is driven in the axis of the seconds so that the peripheral annular zone 34 of the mobile disc 22 is superimposed on the annular marking of the fixed body of FIG. 5, as illustrated by FIG. 6. When the chronograph is actuated, the mobile disc 22 makes a complete rotation in 60 seconds while producing a moiré effect giving the impression that the mobile disc 22 is rotating much faster than it actually is. According to this example, the angular pitch between the segments of the marking on the fixed body represented in FIG. 5 is equal to 360/(N−1)/2 degrees, where N is the number of apertures, which gives a pitch of 6° between truncated sectors.

As an example, if the annular marking of the fixed body of FIG. 5 comprises 30 patterns of a first visual aspect interleaved between 30 patterns of a second visual aspect and if the annular zone 34 of the mobile disc 22 comprises N=31 openings 26 of a shape identical to the shape of the patterns the superimposition according to FIG. 6 of the mobile disc on the marking of the fixed body produces a moiré effect rotating in the same direction as the rotation of the mobile disc 22 when the chronograph is actuated, giving the deceptive impression that the mobile disc rotates in a 2 second interval.

The indication of the seconds 24 represented by a line on the mobile disc 22 indicates however that this latter makes a complete rotation not in two seconds but in 60 seconds. The moiré effect thus has the advantage of indicating at a glance whether the chronograph is stopped or running.

Figure 7:
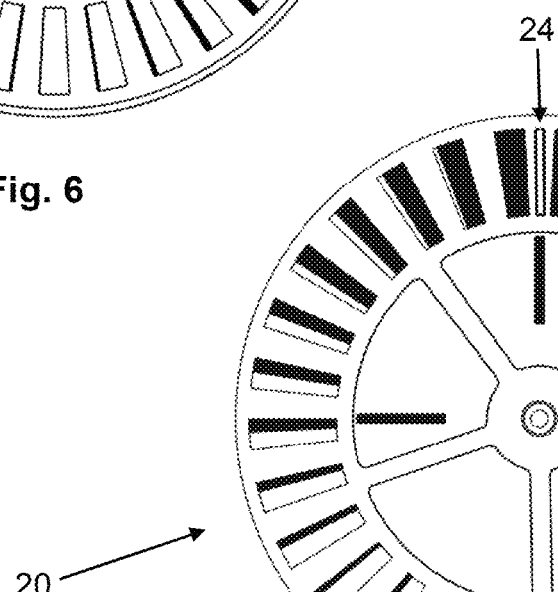
FIG. 7 illustrates the mobile disc of FIG. 4 pivotally mounted to the fixed part of the counter of FIG. 5.

In the case where the annular zone 34 of the mobile disc 22 illustrated in FIG. 4 has N=29 apertures identical to the shape of the patterns, the superimposition of the mobile disc on the marking of the fixed body according to FIG. 5 produces a moiré effect rotating in a direction opposite to the direction of the mobile disc 22 when the chronograph is actuated (FIG. 7).

It is possible to change the period of the moiré effect by changing the visual aspect of the marking and the number of apertures. For example, one of the mobile disc 22 and the fixed body 10 may have N=60 apertures and the other of the mobile disc and the fixed body may have a marking comprising 59 angular sectors with a first visual aspect and 59 angular sectors with a second visual aspect. In this case, the period of the moiré effect will be one second for a mobile disc driven at a rate of one revolution per minute. In view of the size constraints, however, a period of two seconds for the moiré effect is to be preferred.

The moiré effect has the technical advantage of indicating at a glance whether a particular function, in particular a complication of the watch movement of the timepiece, for example a chronograph, is running or stopped.

Moreover, this display allows two different perceived speeds of rotation, or even two different perceived directions of rotation, with a single mobile disc.

The invention claimed is:

1. A timepiece comprising a watch movement including a chronograph or a countdown, the timepiece having a fixed body and a chronograph or countdown counter associated with a display with a moiré effect, wherein said counter is a counter of seconds of the chronograph or countdown for displaying the seconds associated with the chronograph or the countdown, the counter comprising a mobile disc with an indicator of the seconds dissociated from the moiré effect, the mobile disc being, on the one hand, connected to an axis in engagement with the watch movement and, on the other hand, arranged to rotate above or below the fixed body, wherein a rotation axis of the mobile disc is coaxial with a central axis of the counter, one of the mobile disc and the fixed body comprising a plurality of apertures arranged over 360°, the other of the mobile disc and the fixed body comprising a marking with a repetition of patterns including a first set of patterns having a first visual appearance and a second set of patterns having a second visual appearance, the patterns having the first visual appearance being arranged alternately with the patterns having the second visual appearance over 360°, said plurality of apertures being separated from each other by a plurality of portions intended to progressively mask the patterns of the marking in order to produce the moiré effect when the mobile disc is rotated.

2. The timepiece of claim 1, wherein said indicator of the seconds is in the form of a segment disposed on the mobile disc or in the form of a hand mounted on the axis of the mobile disc so that the counter can indicate the seconds.

3. The timepiece of claim 2, wherein the fixed body is attached to a dial and comprises a first annular zone having said marking, and wherein the mobile disc is arranged above the fixed body and has a second annular zone having said plurality of apertures arranged over 360°.

4. The timepiece of claim 3, wherein a pitch between said apertures is smaller than an angular pitch between patterns of the same visual appearance so that the moiré effect occurs in a direction of rotation of the mobile disc.

5. The timepiece of claim 4, the number of apertures being equal to 30 and the mobile disc is arranged to perform one rotation in 60 seconds, so that the moiré effect gives the illusion that the mobile disc performs one rotation in two seconds when a complication of the movement is running.

6. The timepiece of claim 3, wherein a pitch between said apertures is greater than an angular pitch between patterns of the same visual appearance so that the moiré effect occurs in an opposite direction of rotation of the mobile disc.

7. The timepiece of claim 2, wherein the counter has a first annular area comprising said marking, the first annular area being part of the mobile disc, said mobile disc being arranged under the fixed body, and wherein the fixed body has a second annular area superimposed on the first annular area, the second annular area having said plurality of apertures arranged over 360°.

8. The timepiece of claim 7, wherein the second annular area comprises N apertures, said marking comprising N−1 patterns of the same visual appearance.

9. The timepiece of claim 8, N being equal to 29, 30 or 31.

10. The timepiece of claim 7, wherein the second annular area comprises N apertures, said marking comprising N+1 patterns of the same visual appearance.

11. The timepiece of claim 1, wherein the second indicator has a visual appearance different from the first and second visual appearances of the patterns of the marking.

12. The timepiece of claim 11, wherein the second indicator has a visual appearance different from the first and second visual appearance of the patterns of the marking, the second indicator being sized so that a portion of the indicator is visible through an aperture to indicate the second while the other portion of the second indicator is hidden by a portion of the fixed body between two apertures so that the second indicator is always visible upon rotation of the mobile disc.

13. The timepiece of claim 1, wherein the patterns of said first and second sets of patterns are each in the form of a truncated angular segment, spaced apart by an angular pitch equal to $360/(N-1)/2$ degrees or $360/(N+1)/2$ degrees, where N is the number of apertures.

14. The timepiece of claim 1, wherein one of the first and second visual appearances of the patterns of the marking is identical to the visual appearance of the mobile disc provided with the apertures or of the fixed body provided with the apertures.

15. The timepiece of claim 14, wherein there is a high contrast between said first visual appearance and said second visual appearance.

16. The timepiece of claim 1, wherein one of the first and second visual appearances is a uniform black colour, the other of the first and second visual appearances being a uniform white colour.

17. The timepiece of claim 1, comprising a dial, wherein the counter is arranged at a distance from the centre of the dial.

\* \* \* \* \*